United States Patent [19]
Teich

[11] Patent Number: 5,889,383
[45] Date of Patent: Mar. 30, 1999

[54] SYSTEM AND METHOD FOR CHARGING BATTERIES WITH AMBIENT ACOUSTIC ENERGY

[75] Inventor: Paul Teich, Austin, Tex.

[73] Assignee: Advanced Micro Devices, Inc., Sunnyvale, Calif.

[21] Appl. No.: 54,737

[22] Filed: Apr. 3, 1998

[51] Int. Cl.$^6$ .................................................... H02J 7/00
[52] U.S. Cl. ............................ 320/107; 320/123; 455/573
[58] Field of Search ..................................... 320/137, 114, 320/107, 123; 455/426, 550, 573

[56] References Cited

U.S. PATENT DOCUMENTS

| | | | |
|---|---|---|---|
| 4,599,551 | 7/1986 | Wheatley et al. | 322/2 R |
| 5,263,341 | 11/1993 | Lucas | 62/498 |
| 5,554,922 | 9/1996 | Kunkel | 322/3 |
| 5,659,173 | 8/1997 | Putterman et al. | 250/361 C |
| 5,838,138 | 11/1998 | Henty | 320/107 |

*Primary Examiner*—Robert E. Nappi
*Assistant Examiner*—Gregory J. Toatley, Jr.
*Attorney, Agent, or Firm*—Conley, Rose & Tayon; Cyrus F. Bharucha; Jeffrey C. Hood

[57] ABSTRACT

A system and method for charging rechargeable batteries using power from ambient acoustic waves. A first embodiment comprises a system with one or more audio speakers and a battery charger. Each speaker has a transducer that generates an electromotive force (EMF) in response to acoustic waves incident on the speaker. The battery charger receives the EMF from the speaker and charges one or more batteries using the received EMF. A second embodiment comprises a method for charging rechargeable batteries by the steps of generating a sound wave incident on an audio speaker, the speaker generating an EMF, providing the EMF to a battery charger, and the battery charger using the EMF to charge the batteries. A third embodiment comprises a battery charger that uses electrical power generated by one or more audio speakers to charge one or more rechargeable batteries. A rectifying unit in the battery charger receives and rectifies EMFs from the speakers and provides it to the batteries. In a fourth embodiment, the invention comprises a portable telephone, preferably a cordless telephone or a cellular telephone, with a battery charger that uses acoustic energy incident on the speaker of the portable telephone to charge batteries in the telephone. A fifth embodiment of the present invention comprises a portable electronic device, such as a portable radio, a tape recorder, or a hand-held video game, that uses acoustic energy incident on a speaker or microphone to charge batteries in the portable electronic device.

34 Claims, 11 Drawing Sheets

5,889,383

SYSTEM AND METHOD FOR CHARGING BATTERIES WITH AMBIENT ACOUSTIC ENERGY

BACKGROUND OF THE INVENTION

1. Field of the Invention

The present invention relates to the use of acoustic waves for charging batteries in a battery charger or in a portable telephone.

2. Description of the Related Art

Home audio systems use audio speakers to convert audio signal into acoustic waves that can be heard by a user. The audio signals are analog electronic signals that represent the time-variation of the desired acoustic waves. They generally represent music or voice signals with frequency components typically in the range of 50 Hz–20 kHz. Typically, the audio signals are received by an amplifier from a radio receiver, compact-disk player, cassette player, or other audio source, amplified to appropriate voltage and current levels, and provided to one or more audio speakers to generate the corresponding acoustic waves.

Thus, audio speakers are energy transducers that convert electrical energy into acoustic energy. The transduction from acoustic energy to electrical energy is typically performed in the speakers by providing the audio signal to a solenoid to generate a time-varying magnetic field. The time-varying magnetic field then displaces a magnetic element coupled to a speaker diaphragm, causing the speaker diaphragm to vibrate with a displacement indicated by the audio signal. With the audio speaker placed in a listening area, the vibrating speaker diaphragm generates the desired acoustic waves in the air of the listening area.

Rechargeable batteries and battery chargers for rechargeable batteries are well known in the art. The rechargeable batteries are based on a variety of electrochemical reactions, and are generally recharged by applying an appropriate potential across the rechargeable battery to run a current through the rechargeable battery. Some battery chargers monitor the energy stored in a rechargeable battery and adjust the applied potential to optimize the charging process. A main feature of battery chargers is their use of some electrical power source, such as home 120 V AC electrical power source, to drive a current through a rechargeable battery.

It would be useful to have a battery charger that does not draw current from other batteries or from a home 120 V AC electrical power source, but which instead uses an otherwise unused source of power, such as the acoustic energy generated in a room by people in the room performing typical activities such as talking, walking, and moving.

SUMMARY OF THE INVENTION

The present invention comprises a system for charging rechargeable batteries. Included in the system are one or more audio speakers and a battery charger. Each speaker has a transducer that generates an electromotive force (EMF) in response to acoustic waves incident on the speaker. The system receives the EMF from the speakers and charges the batteries using the received EMF. In one embodiment of the present invention, the speaker's transducer includes a speaker diaphragm that moves in response to the acoustic waves, a magnetic element that generates a magnetic field, and a solenoid placed in the magnetic field of said magnetic element. The magnetic element is configured so that the motion of the speaker diaphragm causes the magnetic element to move with respect to the solenoid. The battery charger preferably has an input port that receives the EMFs from the speakers, and a rectifier that generates a rectified voltage in response to said EMF and provides the rectified voltage to the batteries to charge them.

The present invention further comprises a method for charging rechargeable batteries. This method includes the steps of (1) generating a sound wave incident on an audio speaker, (2) the speaker generating an EMF in response to the sound wave, (3) providing the EMF to a battery charger, and (4) the battery charger using the EMF to charge the batteries. To charge the batteries, the battery charger preferably rectifies the EMF to generate a rectified voltage and applies the rectified voltage to the batteries.

The present invention also comprises a battery charger that uses electrical power generated by one or more audio speakers to charge one or more rechargeable batteries. This battery charger has audio ports for receiving audio signals; speaker ports for providing the audio signals to the audio speakers and for receiving EMFs from the audio speakers; a rectifying unit; and a switch. The switch switches the battery charger between one of two operating modes. The first mode is a "active mode" in which the speakers are connected to the audio ports. In the active mode, the audio signals are provided to the speakers so that the speakers may produce the acoustic waves indicated by the audio signals. The second operating mode is a "charge mode" in which the speakers are connected to the rectifying unit. In the charge mode, the speakers provide EMFs generated from ambient acoustic waves to the rectifying unit. The rectifying unit generates a rectified voltage from the EMFs, and places this rectified voltage across the batteries to charge them. The battery charger preferably has a battery holder that holds the batteries in place during charging. The battery holder holds the batteries so that they make a good electrical contact with the battery charger.

Still further, the present invention comprises a portable telephone with a battery charger that uses acoustic energy incident on the speaker or the microphone of the telephone to charge batteries in the telephone. The telephone is preferably a cordless telephone or a cellular telephone. The telephone comprises an audio speaker, a microphone, a telephone unit that generates the audio signal for the speaker, a rechargeable battery that provides electrical power to the telephone unit, and a battery charger that receives an EMF from the speaker and/or from the microphone. The battery charger uses the EMF from the speaker to charge the rechargeable battery.

The present invention also comprises a portable electronic device, such as a portable radio, a tape recorder, or a hand-held video game, that uses acoustic energy incident on a speaker or microphone to charge batteries in the portable electronic device. The portable electronic device comprises a primary functional unit that receives an audio signal or generates an audio signal or both, an acoustic transducer such as a speaker or a microphone, a rechargeable battery that receives an EMF from the acoustic transducer, and a battery charger. The battery charger uses the EMF from the speaker to charge the rechargeable battery.

BRIEF DESCRIPTION OF THE DRAWINGS

Other objects and advantages of the invention will become apparent upon reading the following detailed description and upon reference to the accompanying drawings in which.

Figure 1:
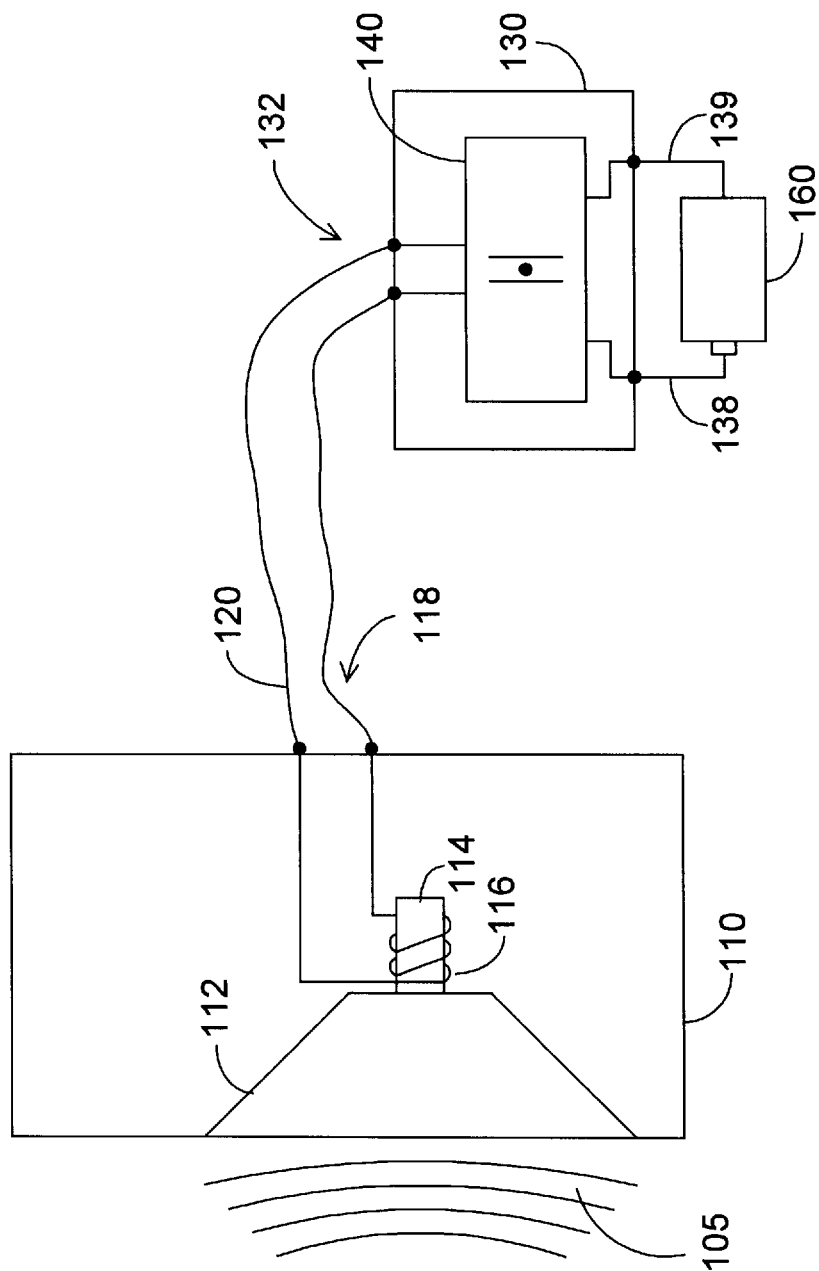
FIG. 1 shows one embodiment of a battery charger using power from a speaker to charge a battery.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1: A battery charger using one speaker to charge one battery.

During operation, an audio speaker transduces electrical power into acoustic power. Depending on the design of the speaker, while the speaker is not being used to generate acoustic waves, its transduction of electrical power to acoustic power can continue—in reverse. That is, acoustic waves incident on the diaphragm of the speaker can result in an electromotive force (EMF) being produced across the leads that provide the audio signal to the speaker during normal operation.

This reverse transduction occurs since acoustic waves impinging on an audio speaker can cause the audio speaker's diaphragm to vibrate, resulting in motion of a magnetic element coupled to the diaphragm, and in motion of the magnetic field generated by the magnetic element. The magnetic element is located in the vicinity of the audio speaker's solenoid, so its motion results in a time-varying magnetic flux through the solenoid. This time-varying flux generates the EMF across the solenoid through Faraday's law of electromagnetic induction. The EMF is an electric potential, or voltage, which can be used to drive an electric current through a load, thereby delivering electric power. As described in the discussion below and in the accompanying figures, the electric power can be harnessed by a battery charger of the present invention to charge rechargeable batteries. The battery charger of the present invention is a passive device that reduces the cost of charging rechargeable batteries by reducing or eliminating the need to draw current from sources such as household 120 V AC wiring to charge the batteries.

FIG. 1 illustrates an embodiment of the present invention in which a battery charger 130 receives electric power from an audio speaker 110 and uses the power to charge a rechargeable battery 160. The speaker has a speaker diaphragm 112, also known as a speaker cone, which vibrates when acoustic waves 105 are incident on speaker diaphragm 112. Fixed to speaker diaphragm 112 is a magnetic element 114 that creates a magnetic field and moves due to the vibration of speaker diaphragm 112. Magnetic element 114 is preferably a permanent magnet. Alternatively, magnetic element 114 may be made from a ferromagnetic material that has been given a magnetic dipole moment, or it may be an electromagnet. A solenoid 116 is mounted in speaker 110 so that solenoid 116 is exposed to the magnetic field of magnetic element 114. Magnetic element 114 and solenoid 116 are oriented with respect to each other so that as magnetic element 114 moves due to the vibration of speaker diaphragm 112, the magnetic flux through solenoid 116 changes in time. Solenoid 116 is coupled to speaker terminals 118, and the changing magnetic flux through solenoid 116 induces an EMF across speaker terminals 118.

Since it is the relative motion of solenoid 116 with respect to magnetic element 114 that causes the time variation in the magnetic flux through solenoid 116, the physical placements of the solenoid and the magnetic element may be swapped. In another embodiment of the invention, the speaker's solenoid is fixed to the speaker cone, and the magnetic element is mounted so that its magnetic field is stationary. In this embodiment, it is the motion of the solenoid through the magnetic field that causes the time-varying magnetic flux through the solenoid, and which generates an EMF across the speaker terminals.

An electrical connector 120 connects speaker terminals 118 to an input port 132 of battery charger 130, and provides the EMF generated by speaker 110 to battery charger 130. Electrical connector 120 is preferably a pair of wires such as speaker wires or other wires suitable for carrying an electric current that results from the EMF being applied to battery charger 130. Battery charger 130 has a rectifier 140 coupled to input port 132. Rectifier 140 receives the EMF from input port 132 and generates a rectified voltage that is substantially equal to the absolute value of the EMF. Battery charger 130 also has a positive output terminal 138 and a negative output terminal 139, which are coupled to rectifier 140. Rectifier 140 provides the rectified voltage to output terminals 138 and 139 so that positive output terminal 138 has an electric potential greater than or equal to the electric potential of negative output terminal 139. These output terminals provide the rectified voltage to rechargeable battery 160 to charge rechargeable battery 160. During recharging, positive output terminal 138 is placed in electrical contact with the positive terminal of battery 160, and negative output terminal 139 is placed in electrical contact with the negative terminal of battery 160.

Figure 2:
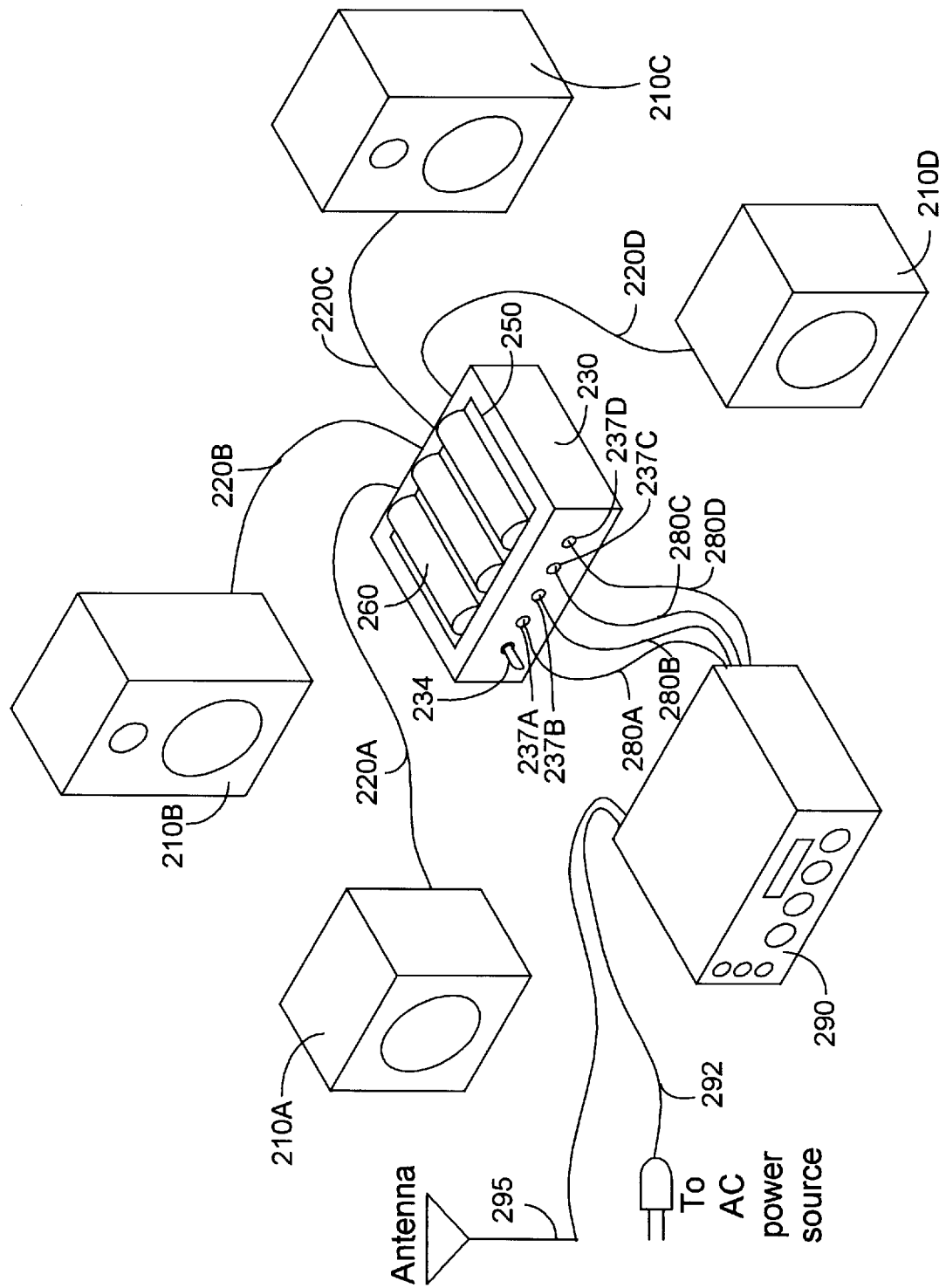
FIG. 2 shows another embodiment of a battery charger and its connections to a home stereo receiver and to audio speakers.

FIG. 2: A battery charger integrated into a home audio system, usable with multiple batteries Home audio systems are typically not used continually. During times when the user is not listening to music or voice from an audio system, the audio speakers connected to the audio system receive no audio signal, and do not generate audible acoustic waves. However, during these periods of inactivity, the audio speakers are typically exposed to acoustic waves from other sources, such as people talking and moving, water faucets running, and appliances such as dishwashers and air conditioners operating. If they are incident on a speaker diaphragm of an audio speaker, the acoustic waves from these other sources can cause the speaker diaphragm to vibrate, thereby generating an EMF at the speaker's terminals.

FIG. 2 shows an embodiment of the battery charger that harnesses the electrical power generated by audio speakers in a home audio system during periods when the audio system is not being used. The battery charger of the current invention may be configured to charge one or more rechargeable batteries from one or more audio speakers. In the embodiment shown in this figure, four speakers provide power to charge three rechargeable batteries.

In this embodiment, a battery charger 230 receives four audio signals through four audio ports 237A, 237B, 237C, and 237D. The audio signals are generated by an audio source 290, which is coupled to audio ports 237A–D through source cables 280A–D. Audio source 290 thus provides the audio signals to battery charger 230, which passes them to audio speakers 210A–D. Battery charger 230 is coupled to the speakers through speaker cables 220A–D, which connect the speakers to battery charger 230 through four speaker ports (not shown in this figure) mounted on battery charger 230.

The audio signals are analog electronic signals that represent the time-variation of acoustic waves to be produced by the speakers. Audio source 290 is shown in FIG. 2 as a home stereo receiver. In the embodiment shown in this figure, audio source 290 is coupled to antenna 295 and receives a radio signal from antenna 295. To generate the audio signals, audio source 290 demodulates the radio signal and amplifies it using power supplied from an AC power source through a power cord 292. In other embodiments of the present invention, audio source 290 is an acoustic amplifier, a synthesizer, a public address system, or other source of audio signals.

Battery charger 230 is coupled to the rechargeable batteries through positive and negative output terminals (not shown in this figure) that make contact with the terminals of one or more rechargeable batteries 260. Battery charger 230 preferably has a battery holder 250 for holding rechargeable batteries 260.

A switch 234 mounted on battery charger 230 allows a user to select between two modes of operation of battery charger 230. In the first mode, called the "active mode," the audio signals provided to battery charger 230 from the audio source 290 are sent directly to audio speakers 210 A–D. In the second mode, called the "charge mode," switch 234 disconnects speakers 210A–D from audio source 290. In the charge mode, battery charger 230 receives EMFs from speakers 210A–C through the speaker ports, and uses electrical power in these EMFs to charge rechargeable batteries 260.

Figure 3:
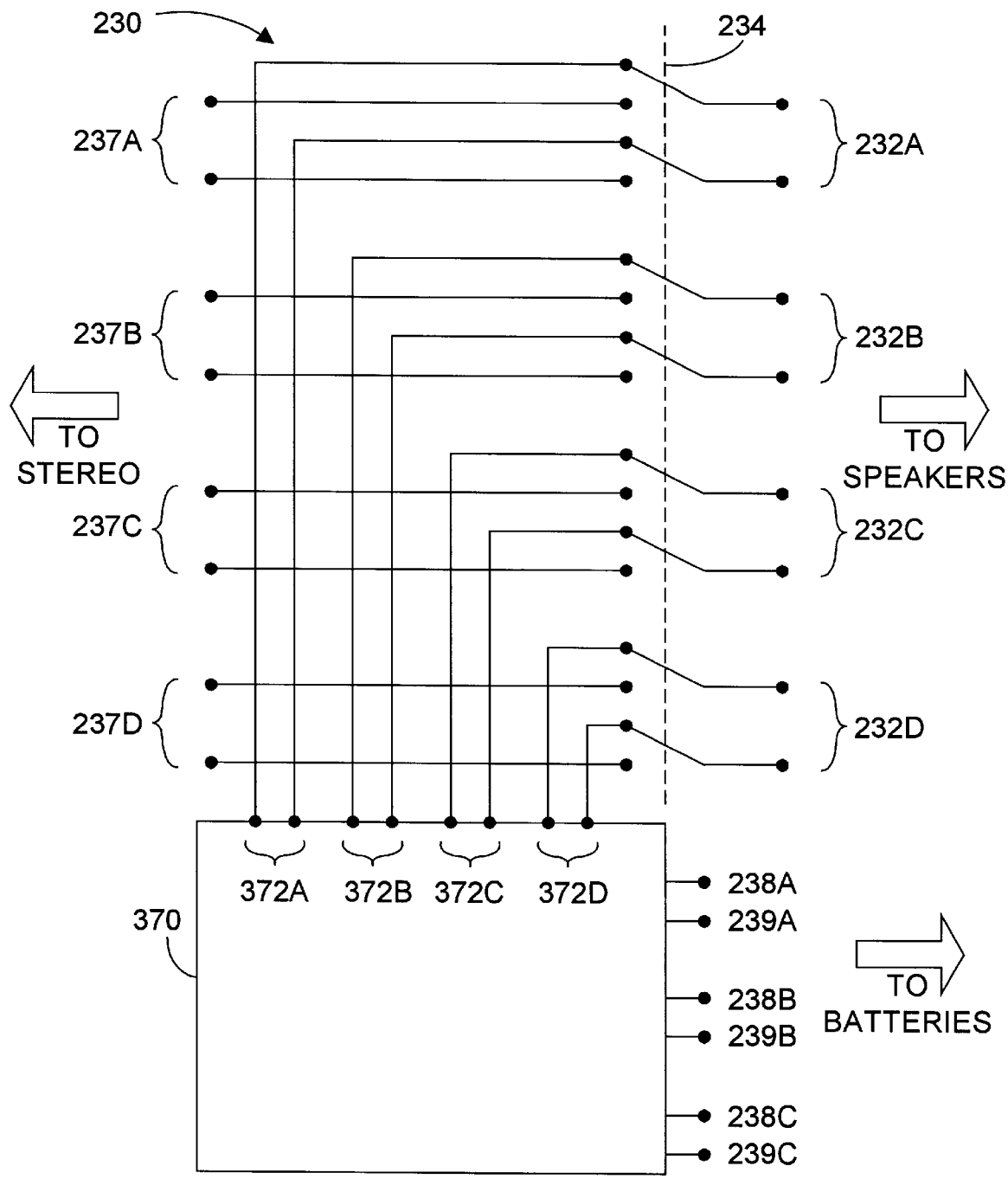
FIG. 3 is a schematic diagram of the battery charger from FIG. 2, showing how the speakers can be switched from the stereo to a rectifying unit.

FIG. 3: Schematic diagram of the battery charger

FIG. 3 shows a schematic of battery charger 230, indicating how switch 234 toggles battery charger 230 between the two operating modes. This figure shows the four speaker ports 232A–D on battery charger 230; speaker cables 220A–D connect to battery charger 230 through these four ports. This figure also shows three positive output terminals 238A–C and three negative output terminals 239A–C, which couple battery charger 230 to rechargeable batteries 260.

In this embodiment, switch 234 is an "eight-pole, two-throw" switch. Its eight poles are coupled to the eight nodes of speaker ports 232A–D on battery charger 230. In the charge mode, as shown in the figure, the switch connects speaker ports 232A–D to four inputs 372A–D on a rectifying unit 370. Rectifying unit 370 then receives EMFs from speakers 210A–D through speaker ports 232A–D, and uses the EMFs to generate a rectified voltage. Output terminals 238A–C and 239A–C are coupled to rectifying unit 370 and are connected across rechargeable batteries 260. Output terminals 238A–C and 239A–C receive the rectified voltage from rectifying unit 370 and apply the rectified voltage across rechargeable batteries 260 to drive a current through rechargeable batteries 260.

In the active mode, switch 234 connects the eight nodes of speaker ports 232A–D to the eight nodes of audio ports 237A–D. In this mode, battery charger 230 thus receives the audio signals from audio source 290 through audio ports 237A–D and provides the audio signals to the audio speakers 210A–D through the speaker ports 232A–D. Thus, the active mode allows speakers to receive the audio signals from audio source 290. In the active mode, rectifying unit 370 receives no EMF from speakers 210A–D, and batteries 260 are not further charged.

Figure 4:
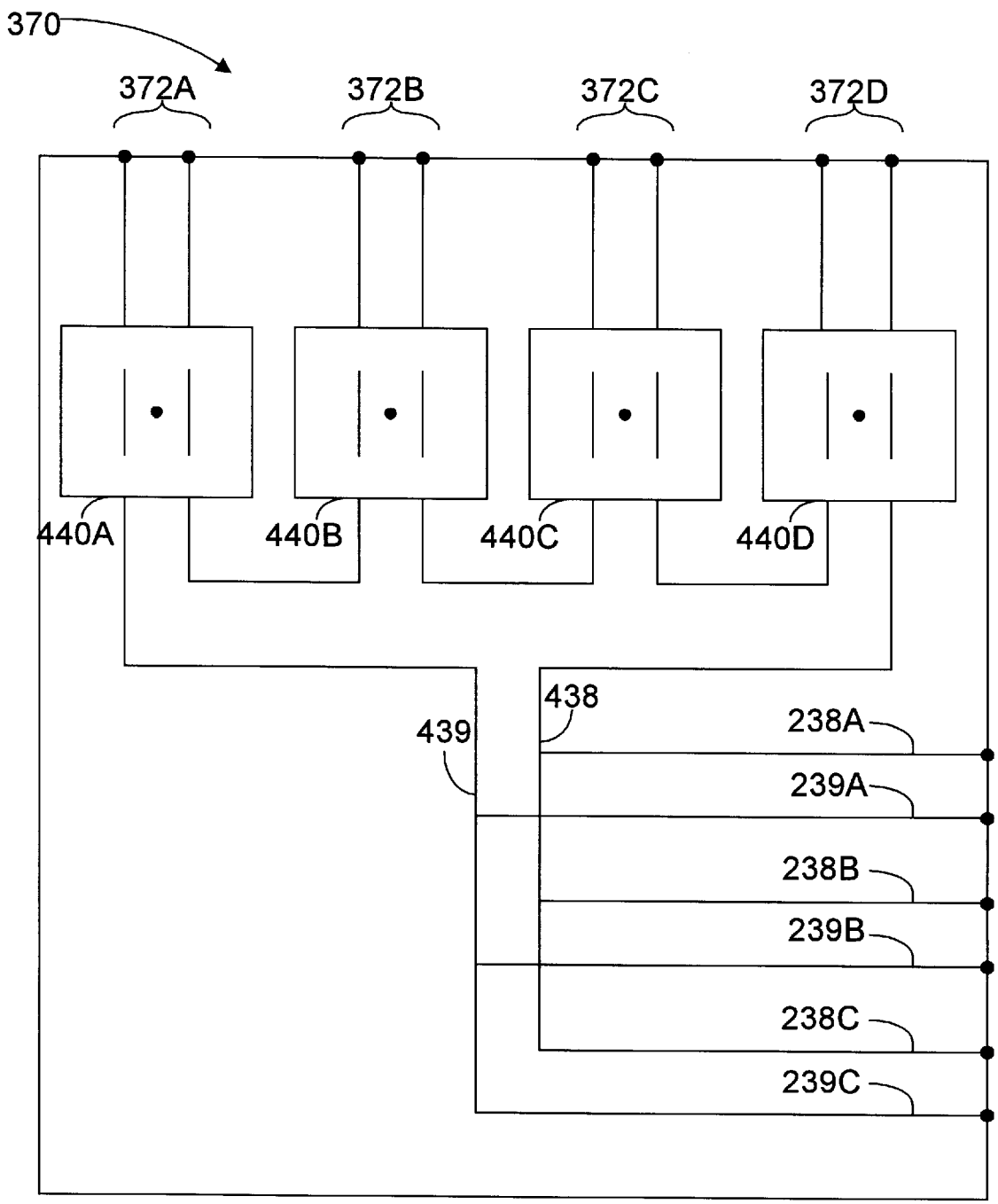
FIG. 4 is a schematic diagram of a first embodiment of the rectifying unit from FIG. 3.
Figure 5:
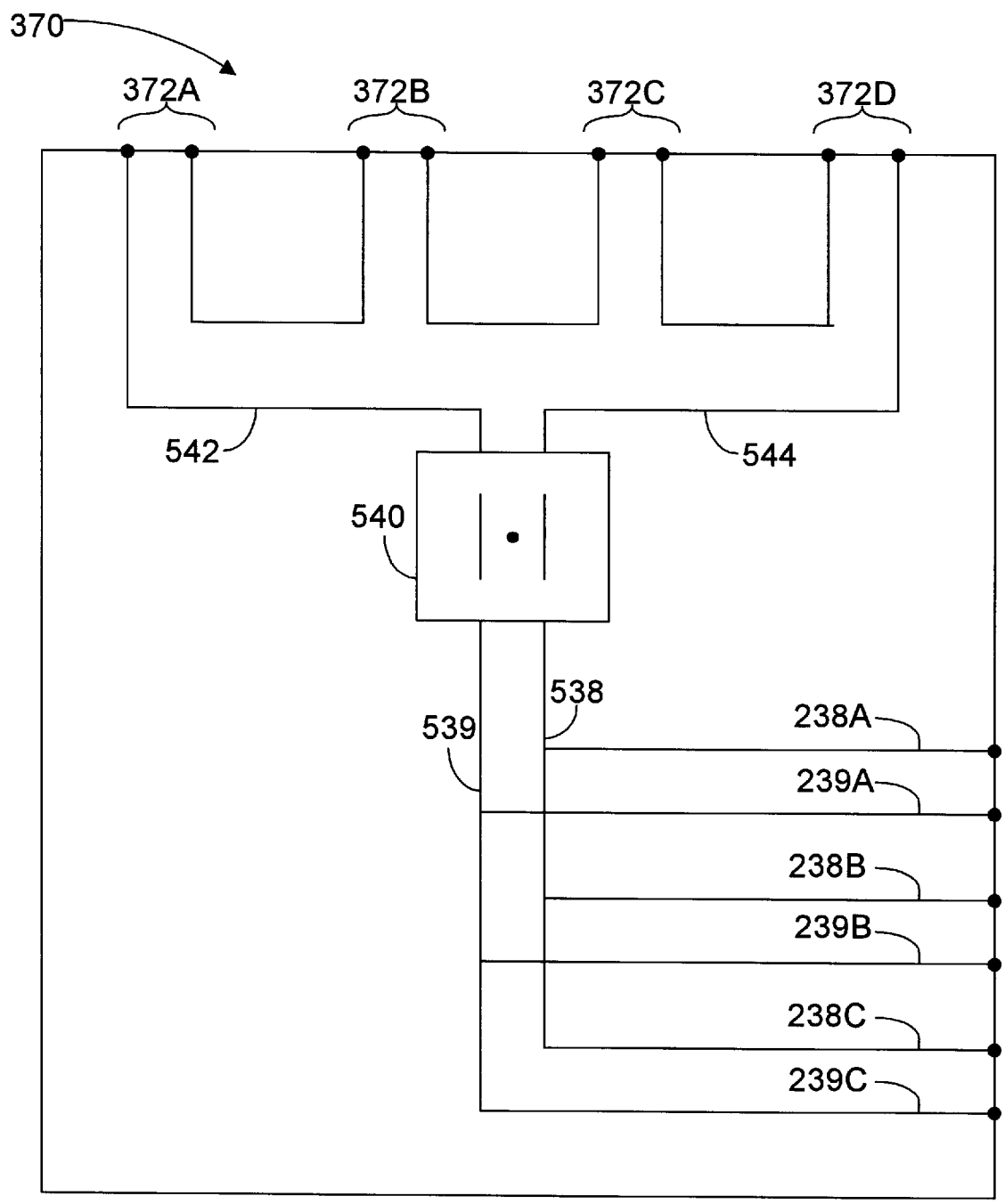
FIG. 5 is a schematic diagram of a second embodiment of the rectifying unit from FIG. 3.

FIGS. 4 and 5: Schematic diagram of the rectifying unit

FIG. 4 is a schematic diagram showing a first embodiment of rectifying unit 370. In the charge mode, inputs 372A–D of rectifying unit 370 are each connected to one of the four speaker ports 232A–D. In this embodiment, rectifying unit 370 has four rectifiers 440A–D that are each coupled to one of the four inputs 372 A–D. Rectifiers 440A–D receive the four EMFs applied to inputs 327A–D. The outputs of the rectifiers are connected in series with each other so that their outputs add to produce a rectified voltage substantially equal to the sum of the absolute values of the four EMFs. A positive output node 438 and a negative output node 439 are at the ends of the series outputs of the rectifiers so that the potential drop from positive output node 438 to negative output node 439 is the rectified voltage. Positive output terminals 238A–C are coupled to positive output node 438, and negative output terminals 239A–C are coupled to negative output node 439.

FIG. 5 is a schematic diagram showing a second embodiment of rectifying unit 370. In this embodiment, inputs 372A–D of rectifying unit 370 are connected in series so that their four EMFs are added. Two nodes 542 and 544 at the two ends of the series inputs 372A–D are coupled to the inputs of a rectifier 540. Rectifier 540 receives the sum of the four EMFs from nodes 542 and 544, and generates a rectified voltage between a positive output node 538 and a negative output node 539. This rectified voltage is substantially equal to the absolute value of the sum of four EMFs. Positive output terminals 238A–C are coupled to positive output node 538, and negative output terminals 239A–C are coupled to negative output node 539.

Figure 6:
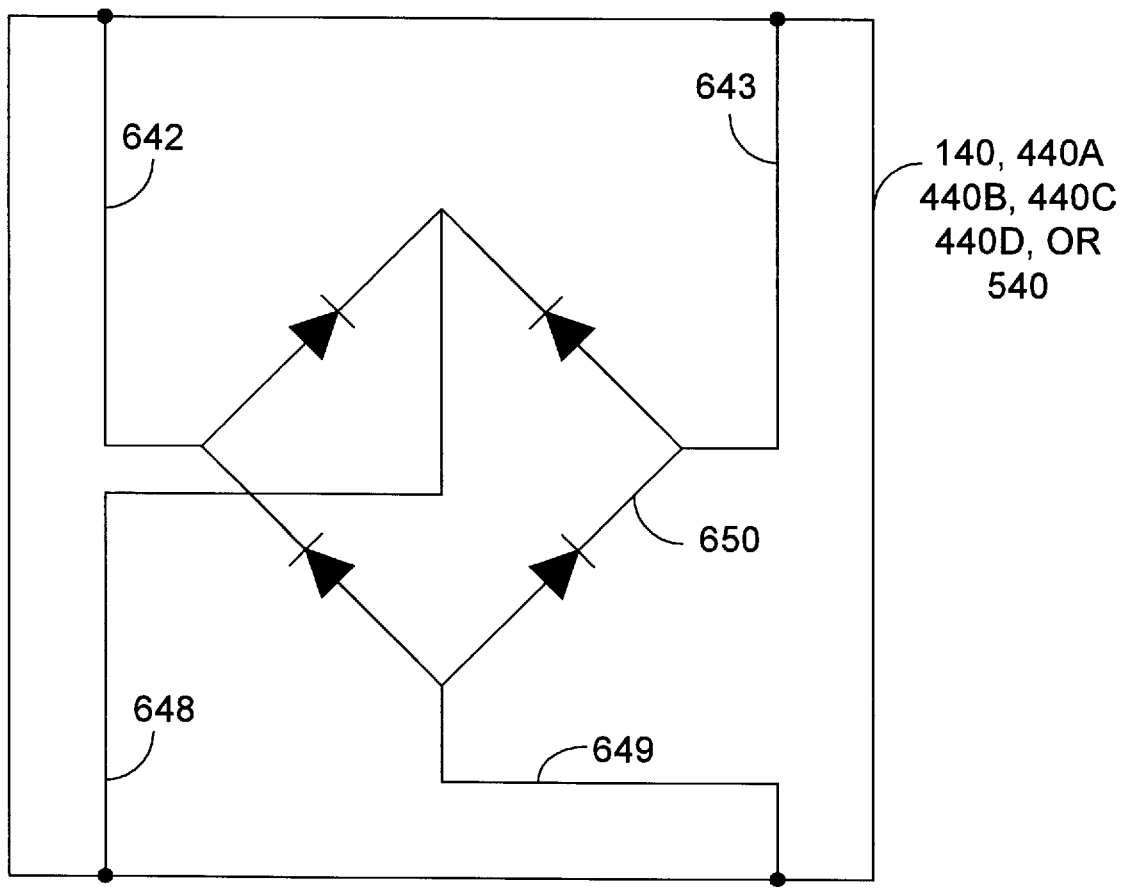
FIG. 6 is a schematic diagram of one embodiment of the rectifiers in FIGS. 1, 4, and 5.

FIG. 6: Schematic diagram of the rectifier

FIG. 6 shows one embodiment of rectifier 140, 440A, 440B, 440C, 440D, or 540. This embodiment of the rectifier has two input nodes 642 and 643, a bridge rectifier 650 coupled to input nodes 642 and 643, a positive output node 648 coupled to bridge rectifier 650, and a negative output node 649 coupled to bridge rectifier 650. Using elements and techniques well known in the art, bridge rectifier 650 is configured to receive an EMF from input nodes 642 and 643 and to generate a rectified voltage, which is substantially equal to the absolute value of the EMF, at output nodes 648 and 649. Other rectifier designs may be used in other embodiments of rectifier 140, 440A, 440B, 440C, 440D, or 540, as would be known to one skilled in the art of electronics design.

Figure 7:
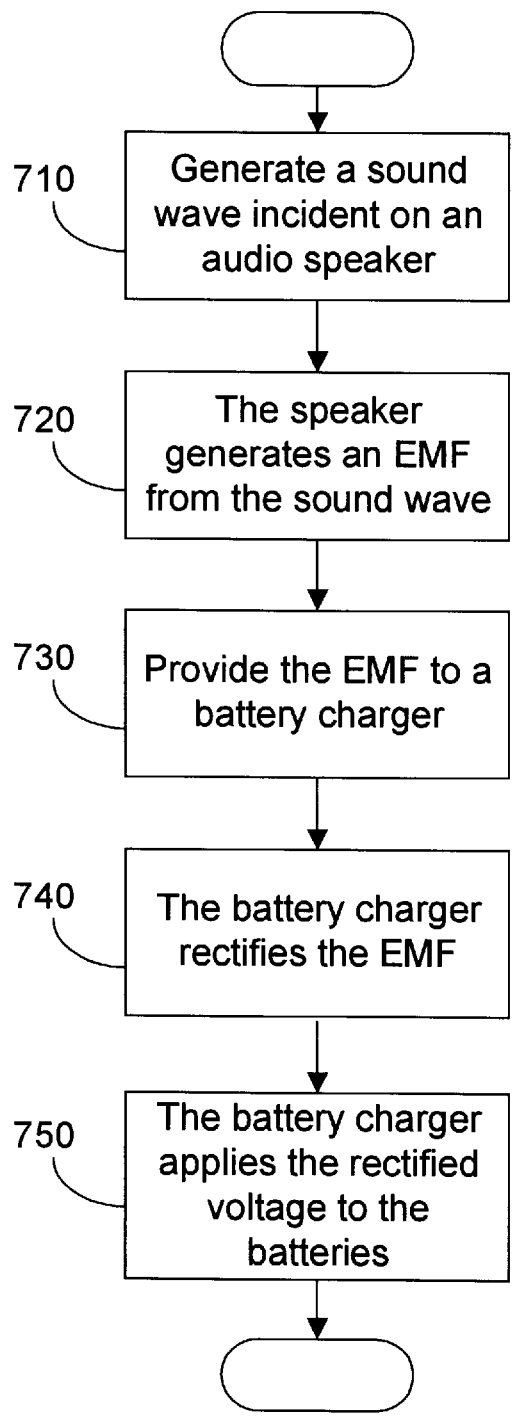
FIG. 7 is a flowchart of a procedure for charging batteries using acoustic energy.

FIG. 7: Flowchart for charging batteries using ambient acoustic waves

A flowchart outlining a procedure for charging rechargeable batteries is shown in FIG. 7. This procedure uses the energy in acoustic waves incident on one or more audio speakers to charge one or more rechargeable batteries. In step 710, a sound wave is generated by one or more acoustic sources. The sound wave preferably carries acoustic energy that is otherwise wasted, such as the ambient sound and noise in a room made by people talking and moving, by water running from faucets, by appliances such as dishwashers and vacuum cleaners, by objects striking and rubbing against each other during normal use, and by other such sources of sounds and noises. In step 720, the speaker transduces the acoustic energy received in step 710 into electrical energy in the form of an EMF that can be used to do work. The EMF is provided in step 730 to a battery charger, which rectifies the EMF in step 740 to generate a rectified voltage in step 740. The battery charger then applies the rectified voltage to the rechargeable batteries in step 750 to charge them.

Figure 8:
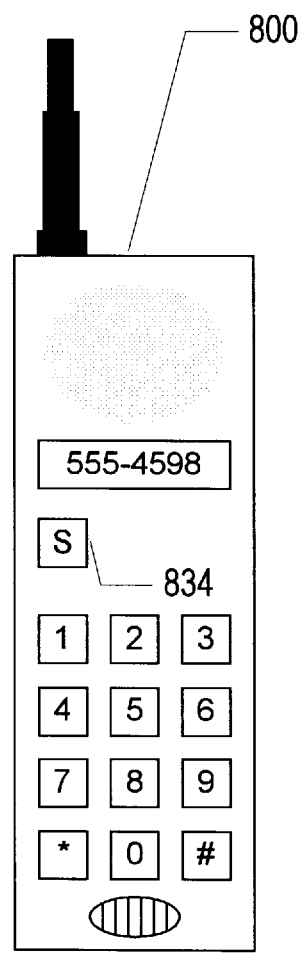
FIG. 8 is a representative view of a portable telephone that uses acoustic energy to charge batteries.
Figure 9:
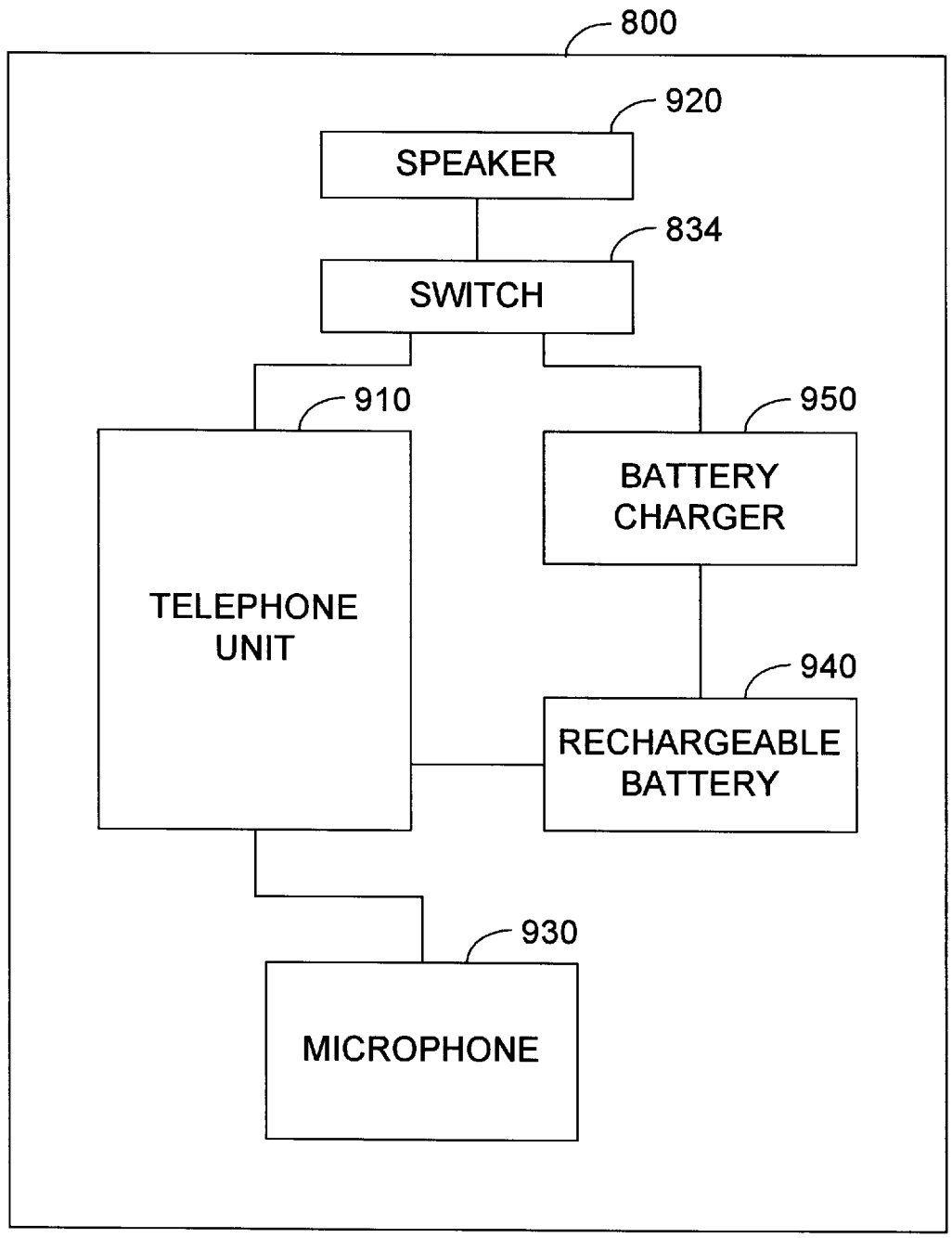
FIG. 9 is a block diagram of one embodiment of the portable telephone from FIG. 8.
Figure 10:
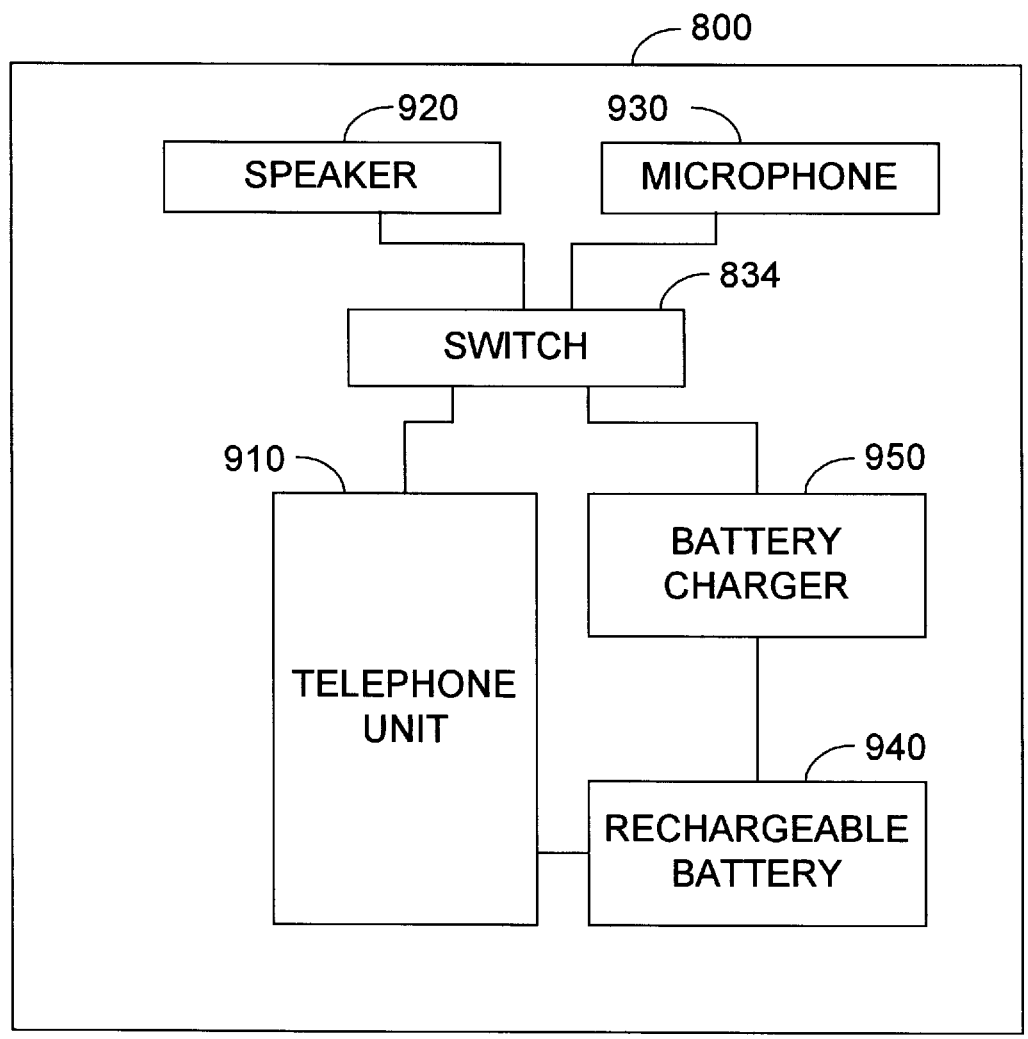
FIG. 10 is a block diagram of another embodiment of the portable telephone from FIG. 8.

FIGS. 8–10: Portable telephone that uses acoustic energy to charge batteries FIG. 8 is a representative drawing of a portable telephone of the present invention. Portable telephone 800 is preferably a cordless or cellular telephone. Telephone 800 uses acoustic energy to charge its rechargeable batteries when it is not being actively used to communicate. Telephone 800 preferably has a switch 834 that allows a user to switch telephone 800 between an active mode and a charge mode. Alternatively, switch 834 may be an automatic switch that places the telephone in the active mode upon the inception of an incoming or outgoing telephone call, and that places the telephone in the charge mode upon the termination of an incoming or outgoing telephone call. Such an automatic switch could be a relay or other circuitry, as would be known to one skilled in the art of electronics design.

A block diagram of telephone 800 is shown in FIG. 9. In addition to switch 834, telephone 800 has a telephone unit 910, a speaker 920, a microphone 930, a battery charger 950, and a rechargeable battery 940. Telephone unit 910 is coupled to speaker 920 through switch 834. Telephone unit 910 is also coupled to microphone 930 and to rechargeable battery 940. In the active mode, portable telephone 800 functions as a regular portable telephone. Telephone unit 910 receives a transmit audio signal from microphone 930, and provides a received audio signal to speaker 920. Telephone unit 910 also contains functionality, as is well known in the art of cordless and cellular telephony for initiating and for receiving telephone calls, and for performing communications with a remote base unit. In the active mode, rechargeable battery 940 provides electrical power to telephone unit 910.

Battery charger 950 is coupled to speaker 920 through switch 834 and to rechargeable battery 940. By appropriately connecting speaker 920 with telephone unit 910 or battery charger 950, switch 834 respectively places telephone 800 in the active mode or in the charge mode.

In the charge mode, speaker 920 generates an EMF in response to acoustic signals incident on speaker 920. Battery charger 950 receives the EMF from speaker 920, and rectifies it to produce a rectified voltage. Battery charger 950 applies this rectified voltage to rechargeable battery 940. By thus using acoustic energy to charge rechargeable battery 940, telephone 800 extends the usable charge time of rechargeable battery 940, thereby increasing the amount of time before rechargeable battery 940 needs to be fully recharged.

In a preferred embodiment of the invention, battery charger is also coupled to microphone 930, and receives a second EMF therefrom when the telephone is in the charging mode. Such an embodiment is shown in FIG. 10. In this embodiment, telephone unit 910 receives electrical power from rechargeable battery 940 and is coupled to speaker 920 and microphone 930 through switch 834. Battery charger 950 receives the EMF from speaker 920 and a second EMF from microphone 930 through switch 834. Battery charger uses the EMF and the second EMF to charge rechargeable battery 940. Switch 834 places telephone 800 either in the active mode or in the charge mode by connecting speaker 920 and microphone 930 either with telephone unit 910 or with battery charger 950, respectively.

Figure 11:
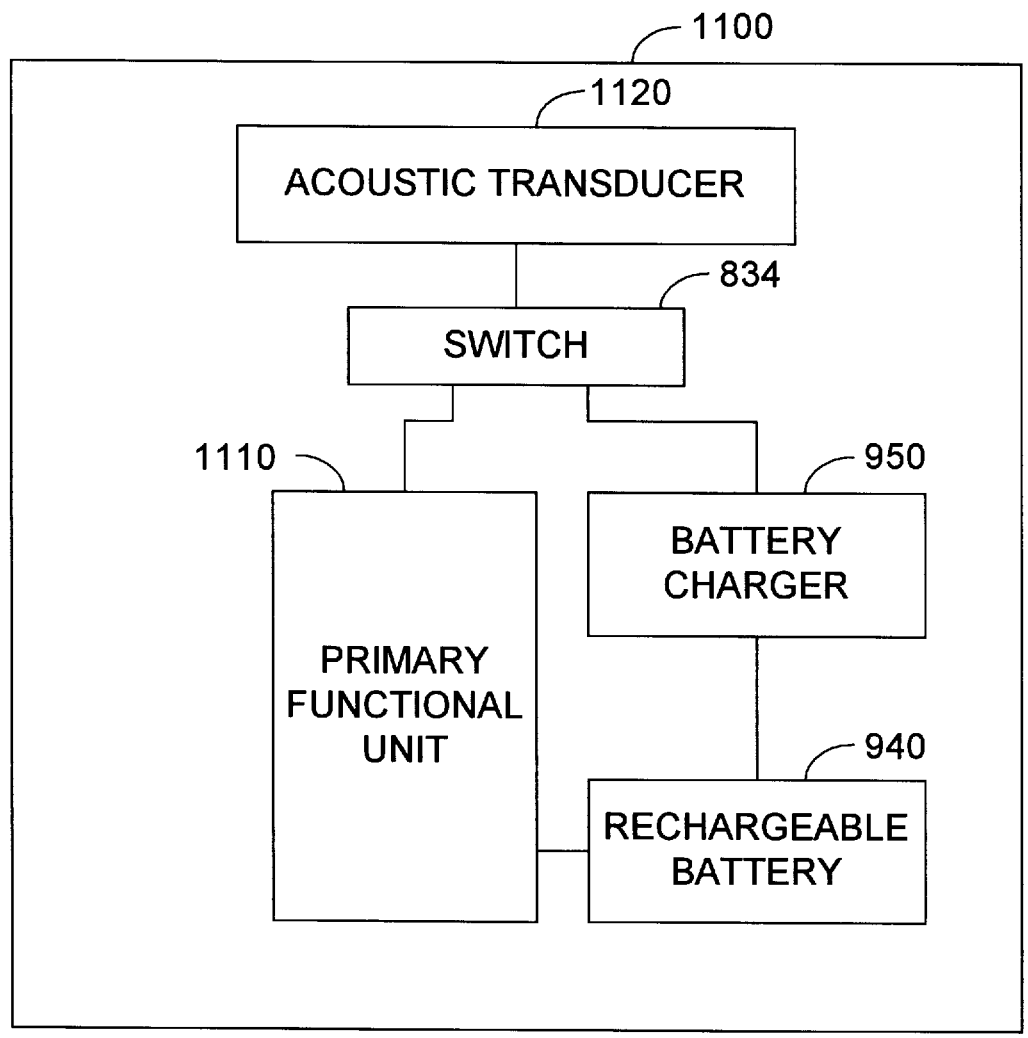
FIG. 11 is a block diagram of a portable electronic device that uses acoustic energy to charge batteries.

FIG. 11: Portable electronic that uses acoustic energy to charge batteries

FIG. 11 shows portable electronic device 1100 that uses electric power from a battery and that uses acoustic energy to charge the battery. Portable electronic device 1100 may be a cordless telephone, a cellular telephone, a portable video game, a tape recorder, a portable radio, a video tape recorder, or some other device that uses batteries and has either a speaker or a microphone or both.

Portable electronic device 1100 has an acoustic transducer 1120, a switch 834 coupled to acoustic transducer 1120, a primary functional unit 1110 coupled to switch 834, a rechargeable battery 940 coupled to primary functional unit 1110, and a battery charger 950 coupled to rechargeable battery 940 and to switch 834. Acoustic transducer 1120 is either a speaker or a microphone or both, as appropriate for the function of portable electronic device 1100. Primary functional unit 1110 is an electronic component that performs the primary operations of portable electronic device 1100, depending on the specific implementation of electronic device 1100. The design of primary functional unit 1110 would be well known to someone skilled in the art of electronic design. For example, if portable electronic device 1100 is a portable radio, then acoustic transducer 1120 is a speaker, and primary functional unit 1110 comprises a radio receiver, and an audio amplifier coupled to the receiver, to rechargeable battery 940, and to switch 834.

Primary functional unit 1110 receives electrical power from rechargeable battery 940 and is coupled to acoustic transducer 1120 through switch 834. Acoustic transducer 1120 generates an EMF in response to acoustic signals incident on acoustic transducer 1120. Battery charger 950 receives the EMF from acoustic transducer 1120 through switch 834, and rectifies the EMF to produce a rectified voltage. Battery charger 950 applies this rectified voltage to rechargeable battery 940. By thus using the acoustic energy to charge rechargeable battery 940, portable electronic device 1100 extends the usable charge time of rechargeable battery 940, thereby increasing the amount of time before rechargeable battery 940 needs to be fully recharged. Switch 834 places portable electronic device 1100 either in an active mode or in a charge mode by connecting speaker 920 and microphone 930 either with telephone unit 910 or with battery charger 950, respectively. In the charge mode, battery charger 950 receives the EMF from acoustic transducer 1120 through switch 834. In the active mode, primary functional unit 1110 communicates with acoustic transducer 1120 through switch 834.

It is to be understood that multiple variations, changes, and modifications are possible in the aforementioned embodiments of the invention described herein. Although certain illustrative embodiments of the invention have been shown and described here, a wide range of modification, change, and substitution is contemplated in the foregoing disclosure and, in some instances, some features of the present invention may be employed without a corresponding use of the other features. Accordingly, it is appropriate that the foregoing description be construed broadly and understood as being given by way of illustration and example only; the spirit and scope of the invention being limited only by the appended claims.

What is claimed is:

1. A system for charging one or more rechargeable batteries, the system comprising:
   one or more audio speakers, wherein each of said speakers comprises a transducer that generates an electromotive force (EMF) in response to acoustic waves incident on said speakers; and
   a battery charger coupled to said speakers and to the batteries, wherein said battery charger receives the EMF from said speakers, and wherein said battery charger is operable to charge the batteries using the received EMF.

2. The system of claim 1, wherein each transducer in each of said one or more audio speakers comprises:
   a speaker diaphragm that moves in response to the acoustic waves;
   a magnetic element that generates a magnetic field; and
   a solenoid placed in the magnetic field of said magnetic element, wherein said magnetic element is configured to move with respect to said solenoid in response to motion of said speaker diaphragm.

3. The system of claim 2, wherein said magnetic element is fixed to said speaker diaphragm.

4. The system of claim 2, wherein said solenoid is fixed to said speaker diaphragm.

5. The system of claim 1, wherein said battery charger comprises:
   an input port that receives the EMF from one or more of said speakers; and
   a rectifier coupled to said input port, wherein said rectifier receives the EMF from said input port, wherein said rectifier generates a rectified voltage in response to the EMF, and wherein said rectifier is operable to provide the rectified voltage to the batteries to charge the batteries.

6. A method for charging rechargeable batteries, the method comprising:
   generating a sound wave incident on an audio speaker;
   the speaker generating an electromotive force (EMF) in response to the sound wave;
   providing the EMF to a battery charger; and
   the battery charger using the EMF to charge the batteries.

7. The method of claim 6, wherein said using the EMF to charge the batteries comprises:
   the battery charger rectifying the EMF to generate a rectified voltage; and
   the battery charger applying the rectified voltage to the batteries.

8. A battery charger that uses electrical power generated by a first number of audio speakers to charge a second number of rechargeable batteries, wherein the first and second numbers are each one or more, the battery charger comprising:
   a first number of audio ports for receiving a first number of audio signals;
   a first number of speaker ports for providing the audio signals to the audio speakers, and for receiving a first number of electromotive forces (EMFs) from the audio speakers;
   a rectifying unit configured to electrically connect to the rechargeable batteries, and configured to charge the rechargeable batteries; and
   a switch coupled to said audio ports, to said speaker ports, and to said rectifying unit,
      wherein said switch receives the audio signals from said audio ports,
      wherein said switch receives the EMFs from said speaker ports,
      wherein said switch is operable to provide the audio signals to said speaker ports, and
      wherein said switch is operable to provide the EMFs to said rectifying unit.

9. The battery charger of claim 8, wherein said rectifying unit comprises:
   a first number of inputs that receive the EMFs from said switch;
   a first number of rectifiers coupled to said inputs, wherein said rectifiers receive the EMFs from said inputs, wherein the outputs of said rectifiers are connected in series to produce a rectified voltage that is substantially equal to the sum of the absolute values of the EMFs; and
   a second number of output terminals coupled to said rectifiers, wherein said output terminals receive the rectified voltage from said rectifiers, and wherein said output terminals are operable to provide the rectified voltage to the rechargeable batteries.

10. The battery charger of claim 8, wherein said rectifying unit comprises:
   a first number of inputs that receive the EMFs from said switch, wherein the inputs are connected in series to produce a sum EMF that is substantially equal to the sum of the values of the EMFs;
   a rectifier coupled to said inputs, wherein said rectifier receives the sum EMF from said inputs and generates a rectified voltage that is substantially equal to the absolute value of the sum of the EMFs; and
   a second number of output terminals coupled to said rectifier, wherein said output terminals receive the rectified voltage from said rectifier, and wherein said output terminals are operable to provide the rectified voltage to the rechargeable batteries.

11. The battery charger of claim 8, further comprising:
   a battery holder, wherein said battery holder is operable to hold the rechargeable batteries, wherein said battery holder comprises one or more connectors coupled to said rectifying unit, wherein said connectors are operable to connect to the rechargeable batteries, and wherein said rectifying unit is operable to connect electrically to the rechargeable batteries through said connectors.

12. A portable telephone that uses acoustic energy to charge batteries in the telephone, the telephone comprising:
   an audio speaker, wherein said speaker comprises a transducer that generates an electromotive force (EMF) in response to acoustic waves incident on said speaker;
   a telephone unit coupled to said speaker, wherein said telephone unit provides an audio signal to said speaker;
   a rechargeable battery coupled to said telephone unit, wherein said rechargeable battery provides electrical power to said telephone unit; and
   a battery charger coupled to said speaker and to said rechargeable battery, wherein said battery charger receives the EMF from said speaker, and wherein said battery charger is operable to charge said rechargeable battery using the received EMF.

13. The telephone of claim 12, further comprising:
a switch coupled to said speaker, to said battery charger, and to said telephone unit, wherein said switch operates to place the telephone in a charge mode by connecting said speaker with said battery charger, and wherein said switch operates to place the telephone in an active mode by connecting said speaker with said telephone unit.

14. The telephone of claim 13, wherein said switch is operated by a user.

15. The telephone of claim 13, wherein said switch is an automatic switch that places the telephone in the active mode at the beginning of an outgoing or incoming telephone call and that places the telephone in the charge mode at the termination of an outgoing or incoming telephone call.

16. The telephone of claim 12, further comprising:
a microphone coupled to said telephone unit and to said battery charger, wherein said microphone comprises a second transducer that generates a second electromotive force (EMF) in response to acoustic waves incident on said microphone, wherein said microphone is operable to provide a second acoustic signal to said telephone unit, and wherein said battery charger receives the second EMF from said microphone, and wherein said battery charger is operable to charge said rechargeable battery using the received second EMF.

17. The telephone of claim 16, further comprising:
a switch coupled to said microphone, to said battery charger, and to said telephone unit, wherein said switch operates to place the telephone in a charge mode by connecting said microphone with said battery charger, and wherein said switch operates to place the telephone in an active mode by connecting said speaker with said telephone unit.

18. The telephone of claim 17, wherein said switch is operated by a user.

19. The telephone of claim 17, wherein said switch is an automatic switch that places the telephone in the active mode at the beginning of an outgoing or incoming telephone call and that places the telephone in the charge mode at the termination of an outgoing or incoming telephone call.

20. The telephone of claim 12, wherein the telephone is a cordless telephone.

21. The telephone of claim 12, wherein the telephone is a cellular telephone.

22. The telephone of claim 12, wherein said transducer in said speaker comprises:
a speaker diaphragm that moves in response to the acoustic waves;
a magnetic element that generates a magnetic field; and
a solenoid placed in the magnetic field of said magnetic element, wherein said magnetic element is configured to move with respect to said solenoid in response to motion of said speaker diaphragm.

23. The telephone of claim 22, wherein said magnetic element is fixed to said speaker diaphragm.

24. The telephone of claim 22, wherein said solenoid is fixed to said speaker diaphragm.

25. The telephone of claim 12, wherein said battery charger comprises:
an input port that receives the EMF from said speaker; and
a rectifier coupled to said input port, wherein said rectifier receives the EMF from said input port, wherein said rectifier generates a rectified voltage in response to the EMF, and wherein said rectifier is operable to provide the rectified voltage to said rechargeable battery to charge said rechargeable battery.

26. A portable electronic device that uses acoustic energy to charge a battery, the portable electronic device comprising:
a primary functional unit that receives or generates an audio signal;
a acoustic transducer coupled to said primary functional unit, wherein said acoustic transducer is a microphone that provides an audio signal to said primary functional unit or a speaker that receives an audio signal from said primary functional unit, and wherein said acoustic transducer generates an electromotive force (EMF) in response to acoustic waves incident on said acoustic transducer;
a rechargeable battery coupled to said primary functional unit, wherein said rechargeable battery provides electrical power to said primary functional unit; and
a battery charger coupled to said acoustic transducer and to said rechargeable battery, wherein said battery charger receives the EMF from said acoustic transducer, and wherein said battery charger is operable to charge said rechargeable battery using the received EMF.

27. The portable electronic device of claim 26, further comprising:
a switch coupled to said acoustic transducer, to said battery charger, and to said primary functional unit, wherein said switch operates to place the portable electronic device in a charge mode by connecting said acoustic transducer with said battery charger, and wherein said switch operates to place the portable electronic device in an active mode by connecting said acoustic transducer with said primary functional unit.

28. The portable electronic device of claim 27, wherein said switch is operated by a user.

29. The portable electronic device of claim 26, wherein the portable electronic device is an electronic game, wherein said acoustic transducer is a speaker, wherein said primary functional unit comprises a keypad, a logic unit, and a video display, wherein said keypad receives input from a user, wherein said logic unit is coupled to said keypad, to said video display, to said speaker, and to said rechargeable battery, wherein said logic unit determines a game outcome in response to the input from the user, wherein said video display receives the game outcome from said logic unit, wherein said video display displays the game outcome, and wherein said logic unit generates the audio signal and provides the audio signal to said speaker.

30. The portable electronic device of claim 26, wherein the portable electronic device is a portable radio, wherein said acoustic transducer is a speaker, wherein said primary functional unit comprises:
a radio receiver coupled to said rechargeable battery, wherein said radio receiver receives electric power from said rechargeable battery, and wherein said radio receiver receives a radio signal and demodulates it into an audio signal;
an audio amplifier coupled to said rechargeable battery, to said radio receiver, and to said switch, wherein said audio amplifier receives electric power from said rechargeable battery, wherein said audio amplifier receives the audio signal from said radio receiver, wherein said audio amplifier generates an in response to said audio signal, and wherein said audio amplifier provides the amplified audio signal to said speaker through said switch.

31. The portable electronic device of claim 26, wherein said acoustic transducer comprises:

a speaker diaphragm that moves in response to the acoustic waves;

a magnetic element that generates a magnetic field; and a solenoid placed in the magnetic field of said magnetic element, wherein said magnetic element is configured to move with respect to said solenoid in response to motion of said speaker diaphragm.

32. The portable electronic device of claim 31, wherein said magnetic element is fixed to said speaker diaphragm.

33. The portable electronic device of claim 31, wherein said solenoid is fixed to said speaker diaphragm.

34. The portable electronic device of claim 26, wherein said battery charger comprises:

an input port that receives the EMF from said acoustic transducer; and a rectifier coupled to said input port, wherein said rectifier receives the EMF from said input port, wherein said rectifier generates a rectified voltage in response to the EMF, and wherein said rectifier is operable to provide the rectified voltage to said rechargeable battery to charge said rechargeable battery.

* * * * *